United States Patent [19]
Chaplin

[11] 3,812,930
[45] May 28, 1974

[54] AIR CUSHION VEHICLE CONTROL DEVICE

[75] Inventor: John B. Chaplin, New Orleans, La.

[73] Assignee: Textron Inc., Providence, R.I.

[22] Filed: May 31, 1972

[21] Appl. No.: 258,394

[52] U.S. Cl. .............................. 180/117, 180/128
[51] Int. Cl. .............................................. B60v 1/00
[58] Field of Search .......... 180/117, 124, 125, 127, 180/128

[56] References Cited
UNITED STATES PATENTS
3,414,077  12/1968  Earl ................................... 180/128

Primary Examiner—Evon C. Blunk
Assistant Examiner—Joseph E. Valenza
Attorney, Agent, or Firm—Bean & Bean

[57] ABSTRACT

An improved valve for controlling discharge of fluid from a flexible discharge conduit of a puff-port system employed in air cushion vehicles. The valve is formed of a flexible material and normally inflated by fluid pressure within the discharge conduit to lie in fluid sealing engagement with its inner surface. Actuation of the valve is effected by deflating same, such as for instance by use of a tension cable. Deactivation or re-inflation of the valve may be assisted by s spring device associated with the valve.

16 Claims, 11 Drawing Figures

PATENTED MAY 28 1974 3,812,930
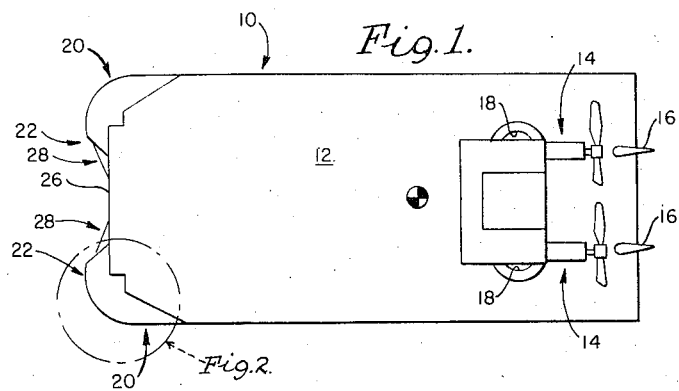
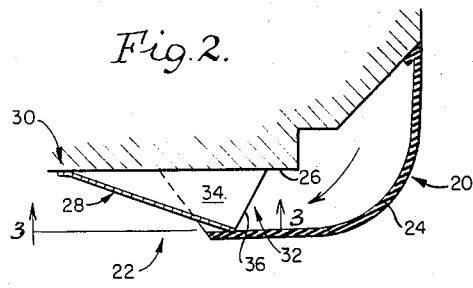
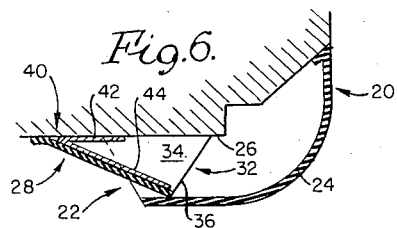
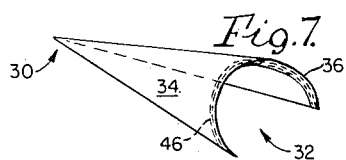
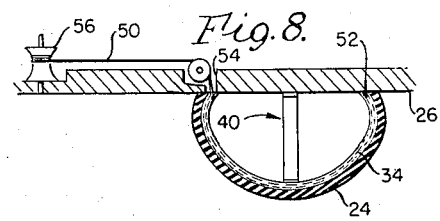
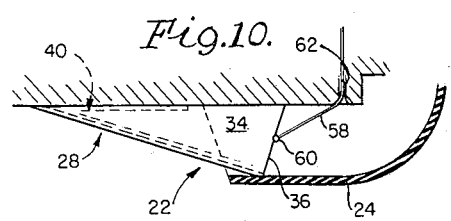
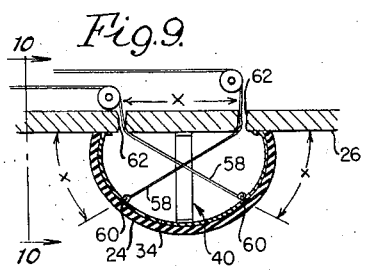
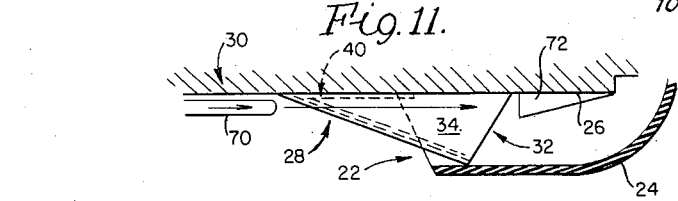

AIR CUSHION VEHICLE CONTROL DEVICE

BACKGROUND OF THE INVENTION

It is known to provide puff-port type directional control systems for air cushion vehicles, wherein a pair of oppositely directed puff-port reaction nozzles are selectively supplied with cushion feed gas, such as air, from a side section of the vehicle opposite to the direction of the nozzle thrust vector.

In a preferred form the nozzles are formed by ducts or conduits of flexible material, which project from adjacent the forwardly facing corners of the vehicle and may function as pneumatic shock absorbers when the vehicle is docked.

A drawback of this prior puff-port system is that the nozzles are provided with "flapper" type flow control valves, which are subject to damage and may permit uncontrolled discharge of air or other gas from the nozzles upon shock absorbing deformation of the nozzles during docking.

SUMMARY OF THE INVENTION

The present invention is directed towards an improved valve having particular utility in controlling the flow of a gas, such as air, from nozzles employed in a puff-port system of the type described above. More particularly, the present invention relates to a gas inflated valve formed of flexible material for use in controlling the flow of gas through a flexible conduit having a shock absorbing capability. The valve of the present invention is characterized as having an enlarged open end arranged to face upstream within a flexible conduit, which defines a gas outlet or thrust nozzle adjacent its downstream end, whereby gas flowing through the conduit towards the nozzle automatically serves to inflate the valve into fluid sealing engagement with the inner surface of the conduit. The valve is operated by mechanically deflating same, such that it is removed from sealing engagement with the conduit. Deactivation or reinflation of the valve may be assisted by a spring device associated therewith. The self-closing or sealing nature of the valve renders it "fail safe" in the event of failure of mechanical opening means and/or the reinflation assisting spring device.

DRAWINGS

FIG. 1 is a plan view of an air cushion vehicle incorporating a puff-port system in which the valve of the present invention has utility;

FIG. 2 is an enlarged view of the area designated as FIG. 2 in FIG. 1, but with parts broken away to illustrate placement of the valve of the present invention within the discharge conduit of the system;

FIG. 3 is a view of the present valve taken generally along line 3—3 in FIG. 2;

FIGS. 4 and 5 are views similar to FIG. 3, but showing alternative valve configurations;

FIG. 6 is a view similar to FIG. 2, but showing the valve provided with a spring return;

FIG. 7 is a perspective view of the present valve illustrating an alternative spring return arrangement;

FIG. 8 is an end view of the embodiment of the valve shown in FIG. 6, but additionally illustrating a valve operating or deflating mechanism;

FIG. 9 is a view similar to FIG. 8, but illustrating an alternative valve operating mechanism;

FIG. 10 is a top plan view of the valve construction of FIG. 9; and

FIG. 11 is a view similar to FIG. 10, but showing an alternative valve operating mechanism.

DETAILED DESCRIPTION

Reference is now made particularly to FIG. 1, wherein 10 designates a surface effect vehicle, which is supported above a reaction surface, such as would be defined by the surface of a body of water, by a cushion of pressurized gas, such as air, bounded beneath vehicle body or "hard structure" 12 by a suitable seal system comprising by way of example a gas inflatable, flexible bag or bag-finger seal system, not shown. Vehicle 10 may be propelled by air-screw propulsion units 14—14 and may be primarily directionally controlled by twin rudder units 16—16 and/or by differentially controlling the propulsion units; directional control being supplemented by operation of puff-port devices as described. As in conventional surface effect vehicles, an air support cushion may be formed by drawing in air from the atmosphere through intake ports 18—18, as by means of fans, not shown, and discharging such air under pressure into the interior of the flexible bag system, which in turn delivers air into the air cushion cavity bounded thereby. Preferably, the flexible bag system is divided into oppositely paired sections perimetrically of the vehicle, and the air cushion cavity may be longitudinally divided to facilitate desired control effects.

The above mentioned puff-port system permits the vehicle operator to momentarily and selectively divert portions of the air cushion cavity air or bag inflation air away from a prescribed peripheral section of the air cushion so as to momentarily lower the support pressure at such section of the vehicle and thereby cause the vehicle to roll over towards that section of its parameter. The diverted air is simultaneously directed by conduits 20—20 to puff-port nozzles 22—22 for discharge horizontally against the ambient air atmosphere at an opposite side of the vehicle with the result that the roll effect is increased and air from the air cushion cavity permitted to escape beneath the seal along the opposite side of the vehicle. Air escaping from adjacent the opposite side of the vehicle augments the side thrust effect of the puff-port operation and greatly increases the degree of maneuverability of the vehicle.

By referring for instance to FIG. 2, it will be understood that each of conduits 20—20 is defined by a flexible material conduit wall section 24, which is affixed along oppositely disposed marginal edges thereof to a hard surface 26 defined by hard structure 12. The wall section, which is continuously inflated by gas, such as air, to balloon outwardly of the hard surface in order to normally assume a predetermined cross-sectional configuration shown for example in FIGS. 8 and 9, may serve as a pneumatic bumper or cushion, during vehicle docking maneuvers.

In accordance with the present invention, the "flapper" type valve disclosed for use in the above mentioned puff-port system is replaced by an inflatable valve construction generally designated as 28 in the drawings. Valve construction 28 is characterized as including a valve body having closed and open ends 30 and 32, respectively, wherein at least open end 30 is arranged within its associated conduit to face in a direction towards the upstream end thereof. The valve body is defined by a flexible material wall section 34, which is fixed along opposite marginal edges to hard surface 26; section 34 being normally inflated by gas entering open end 32 to balloon outwardly of the hard surface in order to conform to and lie in fluid sealing engagement with the inner surface of conduit wall section 24. Wall section 34 may be formed of a single sheet of reinforced elastomeric material, similar to that employed in forming wall section 24.

In a preferred form of the present invention, wall section 34 is patterned to provide a valve body having its cross-sectional area decreasing from adjacent open end 32 towards closed end 30, whereby only a portion 36 of wall section 34 immediately adjacent open end 32 is arranged to engage wall section 24. This construction may be achieved by patterning wall section 34 such that its marginal edges converge to define the pointed, closed end design shown in FIG. 3 or such that its marginal edges are essentially parallel to define rounded and squared closed end designs shown in FIGS. 4 and 5, respectively. It will be seen that in each design the patterning of wall section 34 is such that portion 36 lies within a plane which is inclined outwardly of the hard surface towards the downstream end of conduit 20 and forms an acute angle relative to a plane extending transversely of the conduit.

Further, in accordance with a preferred form of the present invention, resilient means are provided in association with the valve body for the purpose of assisting the latter to return to its normal conduit closed or blocking configuration after deformation or deflation thereof. One form of resilient means is shown in FIGS. 6 and 8-11 as including a "leaf" spring 40, having a first part 42 arranged to engage hard surface 26 and a second part 44 arranged to engage the inner surface of valve body wall section 34. Parts 42 and 44 are connected adjacent closed end 30 to assume a V-shaped configuration and normally bias wall section 34 outwardly for engagement with the inner surface of the conduit.

FIG. 7 illustrates a modified spring construction wherein a flexible band, wire or the like 46 is fixed to extend essentially co-extensively with portion 36 and normally bias same to assume a configuration conforming to the contour normally assumed by the inner surface of conduit wall section 24 when the latter is inflated. While the various spring constructions may serve to assist gas pressure in creation of the seal between the valve body and conduit, their primary purpose is merely to expand or "open" the open end 32 in a controlled or uniform manner in order to facilitate reinflation of the valve body.

Deflation of the valve body, that is deformation of wall section 34, in order to permit passage of gas to puff-port nozzle 22 is preferably effected by an operator controlled cable arrangement. A simplified cable arrangement is shown in FIG. 8 as comprising a cable 50, which is freely received in a "piped" or cuffed edge of portion 36; cable 50 having one end attached to hard structure 12 or wall section 34, as at 52, and an other end passed through hard surface opening 54 for attachment to an operator controlled winch drum or hydraulic cylinder 56. As will be apparent, operation of the valve is effected by alternately drawing in or playing out cable 50.

An alternative cable type valve operating device is shown in FIGS. 9 and 10 as comprising a pair of cables 58—58, which are fixed to wall section 34, as at 60—60, and extend inwardly through hard surface openings 62—62 for connection with suitable operator controls, not shown. Preferably, openings 62—62 are spaced apart through a distance $x$, which corresponds to the distance between hard surface 26 and attachment points 60—60.

FIG. 11 illustrates an additional modified form of valve operator in the form of plate member 70 which is mounted for operator controlled reciprocating movement in an essentially parallel relationship to hard surface 26, whereby to progressively deform or depress wall section 34 in moving from adjacent closed end 30 towards open end 32. An aerodynamic ramp 72 (FIG. 11) is preferably fixed to hard surface 26 immediately upstream of the valve body for the purpose of directing the flow of gas away from the upstream end of the valve body when deflated and thus reduce sidewise deflecting forces on plate member 70. If desired, opposite ends of a single plate member 70 may be employed to control supply of gas to puff-port nozzles 22—22.

From the foregoing, it will be understood that gas under pressure present within the conduit 20 serves to normally maintain the valve body wall section in fluid sealing engagement with the inner surface of the conduit wall section; the gas acting along or in cooperating with a spring device to return the valve body wall section to sealing engagement after mechanical deformation thereof by a valve operator. Since the valve is self-closing or sealing, it is "fail safe" in the event of failure of the mechanical opening means and/or of the reinflation assisting spring device. Also, the flexible nature of the valve body wall section permits the gas to maintain same in fluid sealing engagement with the inner surface of the conduit wall section regardless of changes in contour thereof, which may be encountered during use, such as for instance when the conduit performs a shock absorbing function during a docking operation. While the present valve construction has been described with particular reference to its use in combination with resiliently deformable puff-port nozzle supply conduits, it will be understood that it also possesses utility with other flexible or rigid conduits.

I claim:

1. In an air cushion vehicle, a valve construction for use in controlling flow of gas through a vehicle maneuvering control jet-stream conduit having an upstream end connected to a source of gas under pressure and a downstream end through which gas is to be discharged from the conduit under the control of said valve, said valve construction comprising:
   a valve body having an open end and a closed end, at least said open end being arranged within said conduit to face in a direction towards said upstream end, said valve body including a flexible material wall adapted to intercept gas flowing through said conduit to thereupon inflate and lie in fluid sealing engagement with an inner surface of said conduit; and
   valve operating means for selectively deforming said valve body wall section to remove same from fluid sealing engagement with said inner surface whereby selectively to permit passage of gas across said valve body towards said downstream end of said conduit.

2. A valve construction according to claim 1, wherein resilient means are disposed in association with said valve body wall section and tending to bias same towards an undeformed condition.

3. A valve construction according to claim 2, wherein said resilient means is carried by said valve body wall section marginally of said open end and tends to assume a configuration corresponding to the contour of said conduit inner surface.

4. A valve construction according to claim 1, wherein said valve body is characterized as having a cross-sectional area decreasing from adjacent said open end towards said closed end thereof, whereby only a portion of said valve body wall section adjacent said open end normally lies in engagement with said inner surface as aforesaid.

5. A valve construction according to claim 4, wherein resilient means are disposed in association with said valve body wall section for resiliently biasing said portion into engagement with said inner surface.

6. In an air cushion vehicle a valve construction for use in controlling flow of gas through a vehicle maneuvering control jet-stream conduit having an upstream end connected to a source of gas under pressure and a downstream end through which gas is to be discharged under the control of said valve construction, said conduit being defined by a flexible material conduit wall section affixed along oppositely disposed marginal edges thereof to a hard surface, said conduit wall section being inflated by gas from said source to balloon outwardly of said surface to normally assume a predetermined cross-sectional configuration, said valve construction comprising:
a valve body having open and closed ends, at least said open end being arranged within said conduit to face in a direction towards said upstream end of said conduit, said valve body being defined by a flexible material wall section fixed along oppositely disposed marginal edges thereof to said hard surface, said valve wall section being adapted to intercept gas flowing through said conduit to balloon outwardly of said hard surface to lie in fluid sealing engagement with an inner surface of said conduit wall section; and
valve operating means for selectively deforming said valve body wall section to remove same from sealing engagement with said inner surface, whereby to selectively permit passage of gas through said conduit towards said downstream end.

7. A valve construction according to claim 6, wherein resilient means are disposed in association with said valve body wall section and tends to bias said valve body wall section into a non-deformed condition.

8. A valve construction according to claim 6, wherein said valve body is characterized as having the crosssectional area thereof diminishing from adjacent said open end towards said closed end, whereby only a portion of said valve body wall section extending essentially hoop-wise thereof adjacent said open end of said valve body engages said inner surface.

9. A valve construction according to claim 8, wherein spring means are provided in association with said valve body wall section, said spring means including a first part engaging said hard surface and a second part engaging said body wall section, said parts connected adjacent said closed end of said valve body and biased apart to assume an essentially V-shaped configuration, said valve operating means deforms said valve body wall section to at least partially close said open end against the return bias of said spring means.

10. A valve construction according to claim 8, wherein an elongated spring device is carried by said valve body wall section to extend essentially co-extensively with said portion, and said spring device tends to extend said portion to assume said predetermined cross-sectional configuration.

11. A valve construction according to claim 8, wherein said valve operating means includes a cable device having an end fixed to said portion and extending from said conduit upstream of said valve body through an opening in said hard surface.

12. A valve construction according to claim 8, wherein said valve operating means includes means movably supported by said hard surface downstream of said valve body for engagement with an outwardly facing surface of said valve body wall section for mechanically deflating said valve body.

13. A valve construction according to claim 12, wherein said hard surface mounted means comprises a plate member mounted for reciprocating movement in a direction essentially parallel to said hard surface, whereby to progressively deform said valve body wall section in moving from adjacent said closed end towards said open end.

14. In an air cushion vehicle, in combination:
a maneuvering control conduit attached to the vehicle and having a discharge mouth arching outwardly from said vehicle and directed with respect to the vehicle so as to exert a maneuvering force thereon in response to air blast issuing through said mouth;
means for supplying air under pressure to said conduit;
valve means for selectively controlling air blast through said mouth, said valve means comprising a flexible wall member attached to said vehicle in outwardly arching relation thereto and having an end portion projecting into said discharge mouth and into contact with said conduit normally whereby air pressure within said conduit normally arches said valve means against said conduit to effect a dead end closure extension of said conduit; and
means for selectively flattening the arch-like configuration of said valve means to unseal same from said conduit and permit the air within said conduit to blast through said mouth.

15. In an air cushion vehicle as defined in claim 14 wherein said conduit is formed of flexible sheet material whereby both said conduit and said valve means may flatten against said vehicle without damage.

16. In an air cushion vehicle having a body and air pressure generating means, in combination:
a flexible sheet member attached to an outer wall surface of said body and defining a first scoop-like pocket therewith which pocket is communicated interiorly thereof with said air pressure generating means, said first pocket presenting an open end directed with respect to said vehicle to produce a maneuvering effect thereon in response to air blast through said open end;
a second flexible sheet member attached to said outer wall surface of the body and defining therewith a second scoop-like pocket extending toward and into the open end of said first scoop-like pocket to define a dead end closure therefor normally sealing against the inside surface of said first pocket in response to ballooning force exerted by air under pressure admitted to said first pocket; and means for selectively flattening said second pocket to unseal same from said first pocket and permit air blast escape of air through said open end of the first pocket.

* * * * *

UNITED STATES PATENT OFFICE
CERTIFICATE OF CORRECTION

Patent No. 3,812,930  Dated May 28, 1974

Inventor(s) John B. Chaplin

It is certified that error appears in the above-identified patent and that said Letters Patent are hereby corrected as shown below:

ABSTRACT, line 9, "s" should read -- a --. Column 4, line 5, "x" should read -- "x" --; line 26, "cooperating" should read -- cooperation --. Column 5, claim 6, line 39, before "wall" insert -- body --; claim 9, line 64, before "connected" insert -- being --. Column 6, claim 14, line 47, "flattening" is misspelled.

Signed and sealed this 8th day of October 1974.

(SEAL)
Attest:

McCOY M. GIBSON JR.
Attesting Officer

C. MARSHALL DANN
Commissioner of Patents